United States Patent
Anand et al.

(10) Patent No.: US 10,097,909 B2
(45) Date of Patent: Oct. 9, 2018

(54) SYSTEMS, APPARATUS, AND METHODS FOR SEGMENT ROUTING OF OPTICAL SIGNALS

(71) Applicant: Infinera Corporation, Annapolis Junction, MD (US)

(72) Inventors: Madhukar Anand, Fremont, CA (US); Sanjoy Bardhan, San Jose, CA (US); Ramesh Subrahmaniam, Fremont, CA (US); Soumya Roy, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/249,060

(22) Filed: Aug. 26, 2016

(65) Prior Publication Data
US 2017/0257684 A1    Sep. 7, 2017

Related U.S. Application Data

(60) Provisional application No. 62/303,101, filed on Mar. 3, 2016, provisional application No. 62/331,431, filed on May 3, 2016.

(51) Int. Cl.
| | | |
|---|---|---|
| H04Q 11/00 | (2006.01) | |
| H04L 12/66 | (2006.01) | |
| H04L 12/741 | (2013.01) | |
| H04L 12/947 | (2013.01) | |

(52) U.S. Cl.
CPC ......... *H04Q 11/0066* (2013.01); *H04L 12/66* (2013.01); *H04L 45/745* (2013.01); *H04L 49/25* (2013.01); *H04Q 2011/0077* (2013.01)

(58) Field of Classification Search
CPC .............................. H04J 14/08; H04Q 11/0066
See application file for complete search history.

(56) References Cited

U.S. PATENT DOCUMENTS

| | | | | |
|---|---|---|---|---|
| 2006/0126642 | A1* | 6/2006 | Kojima | H04L 45/04 370/395.52 |
| 2011/0188857 | A1* | 8/2011 | Zheng | H04L 12/6418 398/45 |
| 2015/0103844 | A1* | 4/2015 | Zhao | H04L 45/42 370/410 |
| 2015/0295849 | A1* | 10/2015 | Xia | H04L 47/782 370/235 |
| 2015/0365193 | A1* | 12/2015 | Connolly | H04L 41/0803 398/52 |

* cited by examiner

*Primary Examiner* — Dzung Tran
(74) *Attorney, Agent, or Firm* — David L. Soltz

(57) ABSTRACT

A packet optical network may include a packet optical gateway node that is configured to advertise a segment label to other nodes in the network where the segment label is used by a source node in place of a conventional segment routing label when the source node generates the list of labels included in the header of a data packet while establishing a path through a network. The segment label differs from a conventional segment routing label in that the segment label indicates the L0/L1 device or path as opposed to the L2/L3 device indicated by a conventional segment routing label.

9 Claims, 8 Drawing Sheets

SYSTEMS, APPARATUS, AND METHODS FOR SEGMENT ROUTING OF OPTICAL SIGNALS

CLAIM OF PRIORITY UNDER 35 U.S.C. § 120

The present Application for Patent claims priority to U.S. Provisional Patent Application No. 62/303,101, entitled "Segment Routing Based Unified Control Plane for Packet Optical Integration (POI)," filed Mar. 3, 2016, assigned to the assignee hereof, and expressly incorporated herein by reference in its entirety.

FIELD OF DISCLOSURE

This disclosure relates generally to optical communication networks and more specifically, but not exclusively, to segment routing in packet optical communication networks.

BACKGROUND

Modern packet optical communication networks are composed of two separate domains, the L2/L3 packet domain and the L0/L1 optical domain. The L0 layer is also called the physical layer (See Open Systems Interconnect Model) and uses a bit protocol data unit (PDU) to transmit and receive raw bit streams over a physical medium (e.g. a fiber optic cable). The L1 layer is also called the data link layer (See OSI model) and uses a frame PDU for transmission of data frames between two nodes connected by a physical medium (e.g. IEEE 802.2, Ethernet, IEEE 802.11, etc.). The L2 layer is also called the network layer and uses a packet PDU for structuring and managing a multi-node network, including addressing, routing and traffic control (e.g. IPv4, IPv6, etc.). Layer 3 is also called the transport layer and uses a segment PDU for transmission of data segments between points in a network, including segmentation, acknowledgement, and multiplexing etc. The L0/L1 optical domain is composed of the L0 and L1 layers and is primarily focused on protocols for transmission of data over the physical medium while the L2/L3 packet domain is composed of the L2 and L3 layers and is primarily focused on protocols for address, routing, and transport of data between nodes (e.g. switches, routers) of a network. These nodes may be L0/L1 devices that operate in the L0 and L1 layers or L2/L3 devices that operate in the L2 and L3 layers. In practice, the packet domain is only aware of L2/L3 devices and the optical domain is only aware of L0/L1 devices, but a gateway device is aware of both domains.

For example, Segment Routing (SR, see Internet Engineering Task Force RFC 7855 incorporated herein by reference) is a layer 3 protocol that uses segments to route data packets through a packet optical network. SR leverages source controlled routing for data packets wherein the source node chooses a path for a packet through a packet optical network and encodes the path in the packet header of the packet as an ordered list of segments or labels. A conventional segment/label corresponds to a L2/L3 device or node (i.e. layer 2/layer 3 address for a node). An ordered list of segments/labels is encoded as a stack of segments/labels. As the packet arrives at each L2/L3 node, the current node will use the segment/label at the top of the list of segments/labels to forward the packet to the next node. The current node knows which L2/L3 node is next in the path based on the conventional segment/label next in the ordered lists. However, the segment indicating the next device does not indicate which layer L0 or layer L1 fiber or port, for example, to use in reaching the next device. The current node is preprogrammed with internal cross connects that automatically connect the packet to the correct Layer L0 output port and the right optical fiber that connects to the next L2/L3 device or the next L0/L1 device that will lead to the next L2/L3 device indicated by the segment at the top of the ordered list. As each node forwards the packet, the segment/label used in determining where to forward the packet is removed from the list of segments/labels. While SR is a useful method of routing packets through a packet optical network, there are some drawbacks. One drawback is that the segments/labels are addresses of the L2/L3 nodes in the network. When there are multiple potential L0/L1 devices and paths between two L2/L3 devices, conventional segments do not allow the source node to choose which of the potential paths to use when going from one L2/L3 device to another L2/L3 device. These potential paths are statically programmed into the cross connects of the L2/L3 device connected to either end of these potential paths. Thus, these paths are not dynamically flexible—the source node cannot dynamically choose which of the L0/L1 paths to uses when creating the list of segments.

Accordingly, there is a need for systems, apparatus, and methods that improve upon conventional approaches including the improved methods, system and apparatus that allow a source node to dynamically choose a L0/L1 path or device as part of the segment list for a packet.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method comprises: a first gateway node announcing the first gateway node to a packet optical network; a second gateway node announcing the second gateway node to the packet optical network; the first gateway node transmitting a first segment label to a path computation engine, the first segment label configured to identify the second gateway node in an optical domain of the packet optical network; updating a forwarding table of the first gateway node with the first segment label; transmitting the first segment label to a first packet node; and appending, by the first packet node, the first segment label and a second segment label to a packet, the second segment label configured to identify the first gateway node in a packet domain of the packet optical network.

In another aspect, a method comprises: determining a first segment label that identifies a second optical packet device in an optical domain of a packet optical network; storing the first segment label in a forwarding table of a first packet optical device; sending the first segment label to a path computation engine; sending, by the path computation engine, the first segment label to an ingress node; generating a plurality of segment labels, each of the plurality of segment labels representing a respective one of a plurality of L2/L3 device between the ingress node and an egress node in the packet optical network; appending, by the ingress node, the plurality of segment labels and the first segment label to a packet; forwarding, by the ingress node, the packet to the egress node based on the plurality of segment labels and the first segment label.

In still another aspect, a non-transitory computer-readable medium comprises instructions that, when executed by a processor, cause the processor to: announce a first gateway node to a packet optical network; announce a second gateway node to the packet optical network; transmit a first segment label to a path computation engine, the first segment label configured to identify the second gateway node in an optical domain of the packet optical network; update a forwarding table of the first gateway node with the first segment label; transmit the first segment label to a first packet node; and append the first segment label and a second segment label to a packet, the second segment label configured to identify the first gateway node in a packet domain of the packet optical network.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
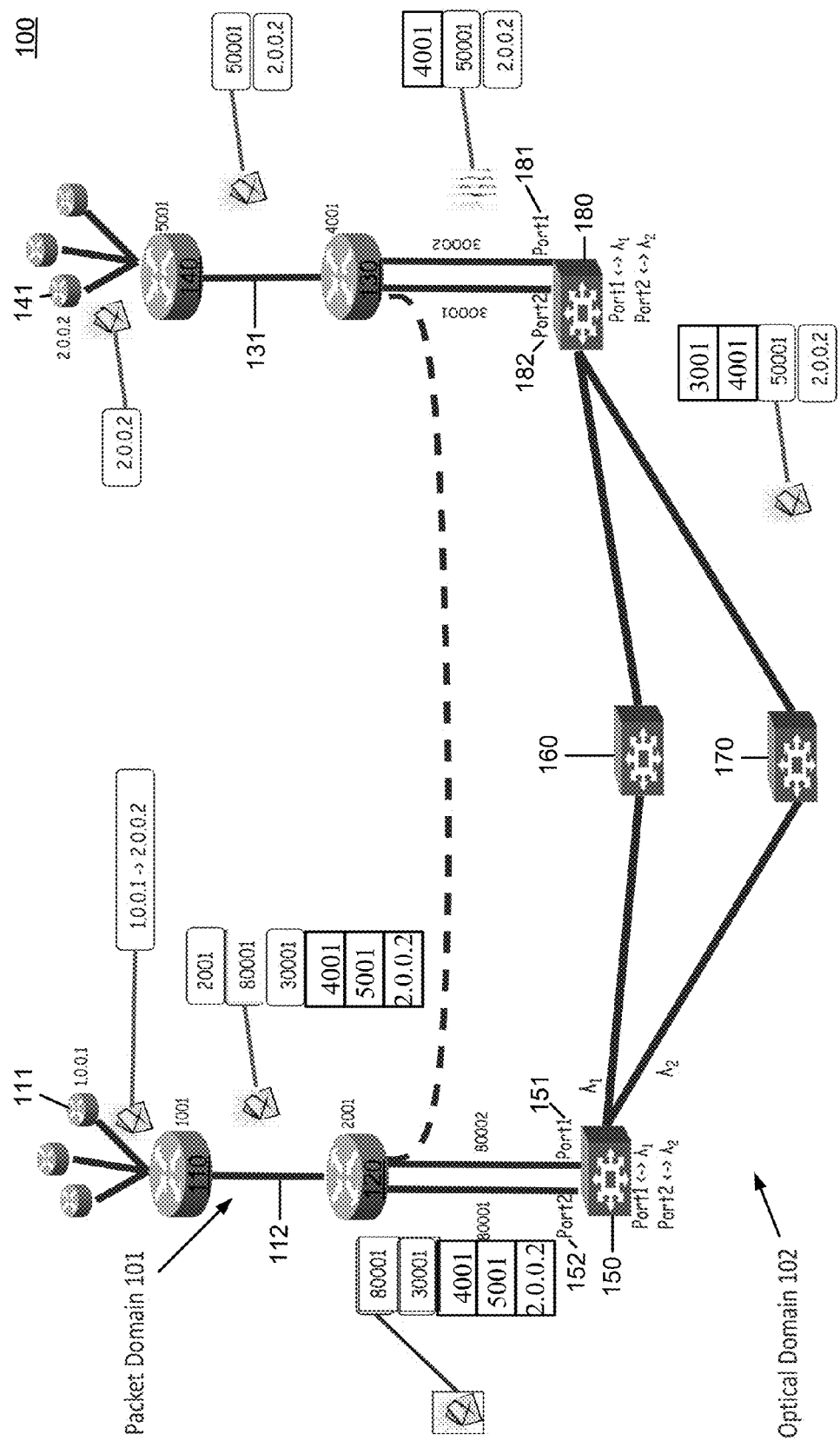
FIG. 1 illustrates exemplary components of a packet optical network in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems. For example, a packet optical network may include a packet optical gateway node that is configured to advertise an segment label to other nodes in the network where the segment label is used by a source node in place of a conventional segment routing label when the source node generates the list of labels included in the header of a data packet while establishing a path through a network. The segment label differs from a conventional segment routing label in that the segment label identifies (layer 0/layer 1 address) the packet optical gateway node in an optical domain instead of the logical address (layer 3/layer 2 address) of the node. This allows the packet optical gateway to avoid the necessity of translating the logical address of a label to a physical address of the next link/node the packet optical gateway needs to forward the packet to along the intended path.

FIG. 1 illustrates exemplary components of a packet optical network 100 in accordance with some examples of the disclosure. As shown in FIG. 1, a packet optical network 100 may include a packet domain 101 and an optical domain 102. The packet domain 101 may include a first packet node 110 (e.g. node 12 in FIGS. 5A-5D below) with a packet domain address of 1001, a second gateway node 120 with a packet domain address of 2001, a third gateway node 130 with a packet domain address of 4001, and a fourth packet node 140 with a packet domain address 5001. The first packet node 110 and the fourth packet node 140 are L2/L3 devices that are each coupled to a plurality of client devices, such as a first client device 111 with a packet address of 1.0.0.1 and a second client device 141 with a packet address of 2.0.0.2. The second gateway node 120 and the third gateway node 130 are packet optical gateway devices that include a L2/L3 component (node 120 and node 130 respectively) and a L0/L1 component (node 150 and node 180 respectively). The optical domain may include a fifth optical node 150 (the L0/L1 component of the second gateway node 120) with first port 151 having a packet address of 8002 and a second port 152 with a packet address of 8001, a sixth optical node 160 coupled to the first port 151, a seventh optical node 170 coupled to the second port 152, and an eighth optical node 180 (the L0/L1 component of the third gateway node 130) with a first port 181 coupled to the sixth optical node 160 and a second port 182 coupled to the seventh optical node 170.

In the packet domain 101, the L2/L3 devices are only aware of other L2/L3—the first packet node 110, the second gateway node 120, the third gateway node 130, and the fourth gateway node 140—for the purposes of segment routing/addressing packets to transmission between these devices. In a conventional packet domain, only these four devices would have a packet address (1001, 2001, 4001, and 5001) and a segment routing list for a packet that is intended to travel, for example, between the first packet device 110 and the fourth packet device 140 would only include these four packet addresses. In the optical domain 102, the L0/L1 devices are only aware of other L0/L1 devices—the fifth optical node 150, the sixth optical node 160, the seventh optical node 170, and the eighth optical node 180.

In a conventional packet optical network, packets intended to travel from a first client device 111 to a second client device 141 would first enter the network at the first packet node 110. The first packet node 110 would then append a list of segments labels to each packet (See FIG. 2) as—2001, 4001, 5001, and 2.0.0.2. As each packet would reach a device, the segment label from that device would be removed and the packet would be forward to the next packet address in the list. When the packet reaches 2001, the next device is 4001. However, the packet would actually travel over the optical domain 102. This would be accomplished by preprogramming the cross connects within the device 2001 to route the packets over λ2 as shown to reach device 4001. This conventional approach does not allow any flexibility in choosing which optical path the packet will travel between device 2001 and 4001. In fact, the first packet node 1001 is not even aware of the available routes between device 2001 and device 4001.

In the packet optical network 100 according to some examples, the packet optical network 100 may include the second gateway node 120 as device 2001 and the third gateway node 130 as device 4001. These gateway nodes 120 and 130 have the capability to generate a segment label for each optical port of the incorporated L0/L1 component 150 and 180 respectively to indicate which optical path a packet is intended to travel. In this example, the first port 151 of component 150 is assigned an address of 8002 and the second port 152 of component 150 is assigned an address of 8001. Similarly, the first port 181 of component 180 is assigned an address of 3002 and the second port 182 of the component 180 is assigned an address of 3001. These new addresses are then advertised in a manner similar to the well-known technique in the SR protocol of advertising an address for each L2/L3 device. This will allow the first packet node 110 to selectively choose which optical paths—8001, 8002, 3001, or 3002 the packet will travel.

Figure 2:
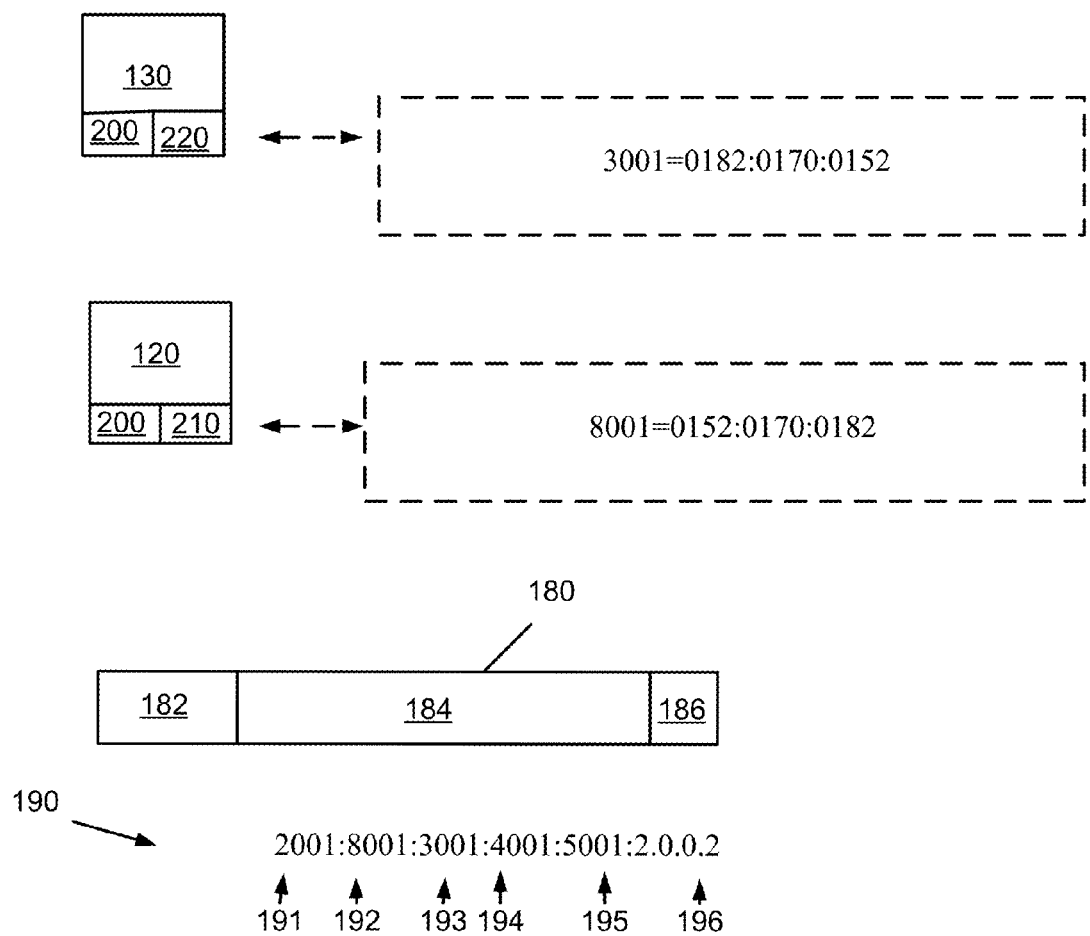
FIG. 2 illustrates exemplary components of a forwarding table and segment list in accordance with some examples of the disclosure.

As shown in FIG. 1, the first node 110 is connected to the second node 120 by a first optical link 112 (e.g. an optical fiber). The second node 120 is connected to the third node 130 by a second optical link 121 that includes the first wavelength λ1 and the second wavelength λ2. The third node 130 is connected to the fourth node 140 by a third optical link 131. As shown in FIG. 2, nodes 110-140 may be packet optical devices that are connected via optical links 150-170 configured to transport a data packet 180 from one node to another node. Data packet 180 may include a header section 182 configured to include node addresses such as segments/labels 190, a payload section 184 configured to include a data payload, and a tail section 186 configured to include additional information about the packet 180 or its intended path through network 100.

Nodes 110 and 140 may be edge devices connected to customer or client devices 111 and 141. Nodes 120 and 130 may be packet optical gateway (POG) nodes that generate the segment labels for their respective L0/L1 components. A packet service may be established between node 110 (ingress node) and node 140 (egress node) by specifying a path between node 110 and node 140 in the header 182. In the example of FIG. 1, the header 182 includes an ordered list of segments/labels 190 that include the path of the packet. For example, the ordered list starts with a first label 191, followed by a second label 192, a third label 193, a fourth label 194, a fifth label 195, and a sixth label 196. Each of these labels 191-197 indicate an address for a node 110-140 or an optical node 150-180. In this case, 2001 corresponds to the second gateway node 120, 8001 corresponds to the second port 152 of the optical node 150, 3001 corresponds to the second port 182 of the optical node 180, 4001 corresponds to third gateway node 130, 5001 corresponds to the fourth packet node 140, and 2.0.0.2 corresponds to the client device 141. To leverage segment routing to define the above service, the ingress node 110 would append all outgoing packets in the header 182 consisting of the labels that constitute the path.

Once either node 120 or node 130 generates a segment label for each L0/L1 component connected to the gateway nodes, the gateway nodes announce the labels to a conventional path computation engine (located in a remote server or any of the nodes in the network). Each packet node in the network 100 would then update a forwarding table with the segment labels, such as packet optical gateway nodes 120 and 130 and respective forwarding tables 210 and 220 that will have a forwarding table entry 230 that corresponds to the designated path 21 or 22 so that the node 120 or node 130 will forward the packet with label 194 along the path 21 or 22 identified in the respective forwarding table 210 or 220. As shown in FIG. 2, the nodes 120 and nodes 130 may include a well-known conventional Path Computation Engine (PCE) 200 configured to determine a physical path between these nodes. The PCE 200 may reside in each POG or in a remote server such as SDN controller 10 (See FIG. 5A-5D).

Figure 3:
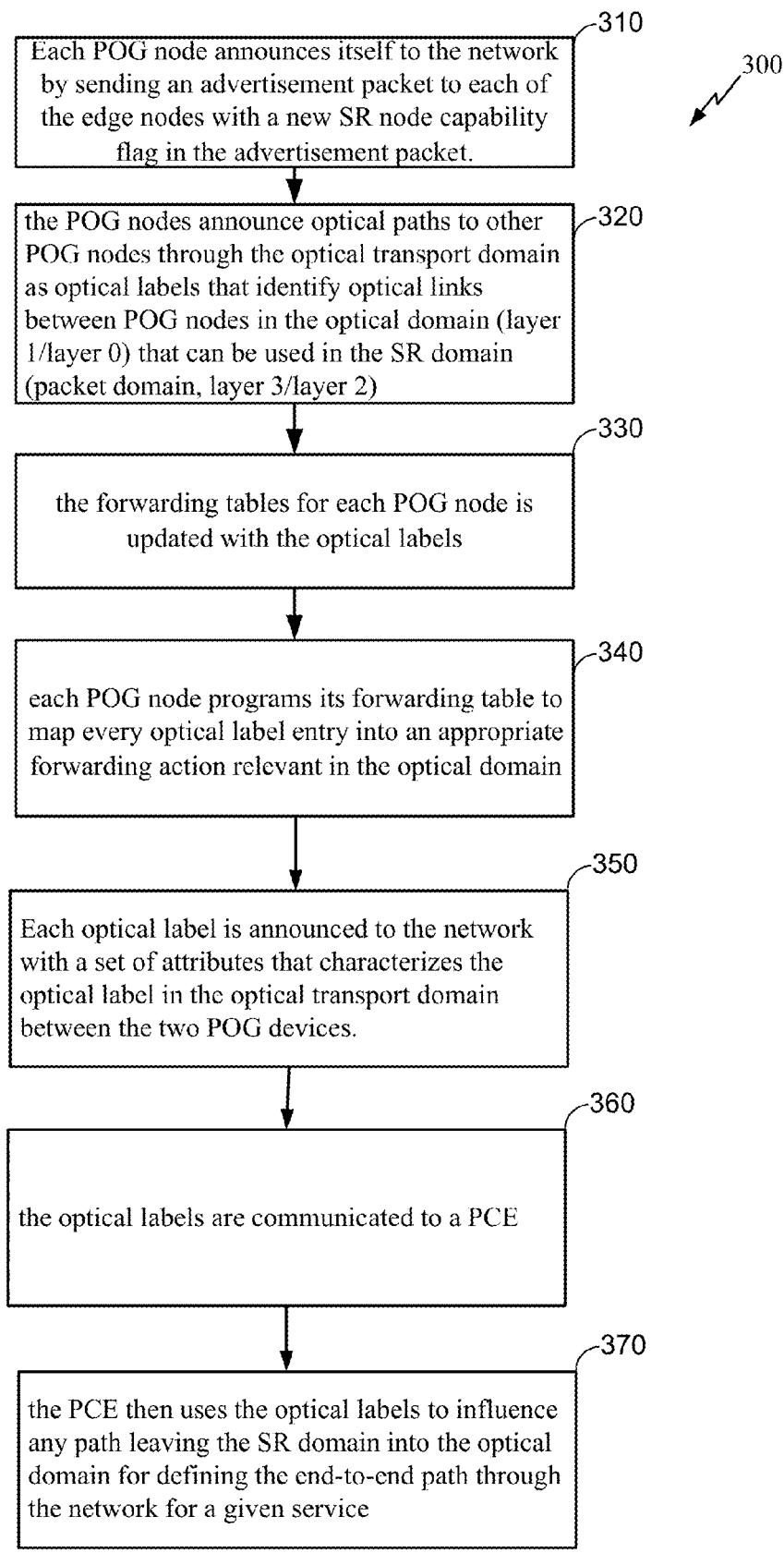
FIG. 3 illustrates an exemplary process for advertising a segment label in accordance with some examples of the disclosure.

FIG. 3 illustrates an exemplary process for generating a segment label in accordance with some examples of the disclosure. As shown in FIG. 3, the process 300 begins in block 310 with each POG node announcing itself to the network by sending a conventional advertisement packet to each of the edge nodes with a new SR node capability flag in the advertisement packet. In block 320, the POG nodes announce optical paths to other POG nodes through the optical transport domain as segment labels that identify optical links between POG nodes in the optical domain (layer 1/layer 0), which can be used in the SR domain (packet domain, layer 3/layer 2). The segment labels are announced with an appropriate transit domain type, optical transport domain ID, and the segment label to be used to bind to the segment. In block 330, the forwarding tables for each POG node is updated with the segment labels (bind the segment corresponding to the segment label). In block 340, each POG node is also responsible for programming its forwarding table to map every segment label entry into an appropriate forwarding action relevant in the optical domain, such as mapping it to a label-switched path. In block 350, the bound segment may also optionally be announced to the network (e.g. edge nodes or PCEs) with a set of attributes that characterizes the bound segment in the optical transport domain between the two POG devices. For instance, those attributes could define the OTN mapping used (e.g., ODU4, ODU3, ODU3e1 . . . ODU1), timeslots (1-8 or 4, 6, 7 or 1-2, 5), or optical path protection schemes. In block 360, the segment labels are communicated to the PCE (in a node or remote controller 10) using the well-known conventional extensions to Border Gateway protocol link state or PCE protocol link state. In block 370, the PCE then uses the segment labels to influence the path leaving the SR domain into the optical domain, thereby defining the end-to-end path for a given service.

Figure 4:
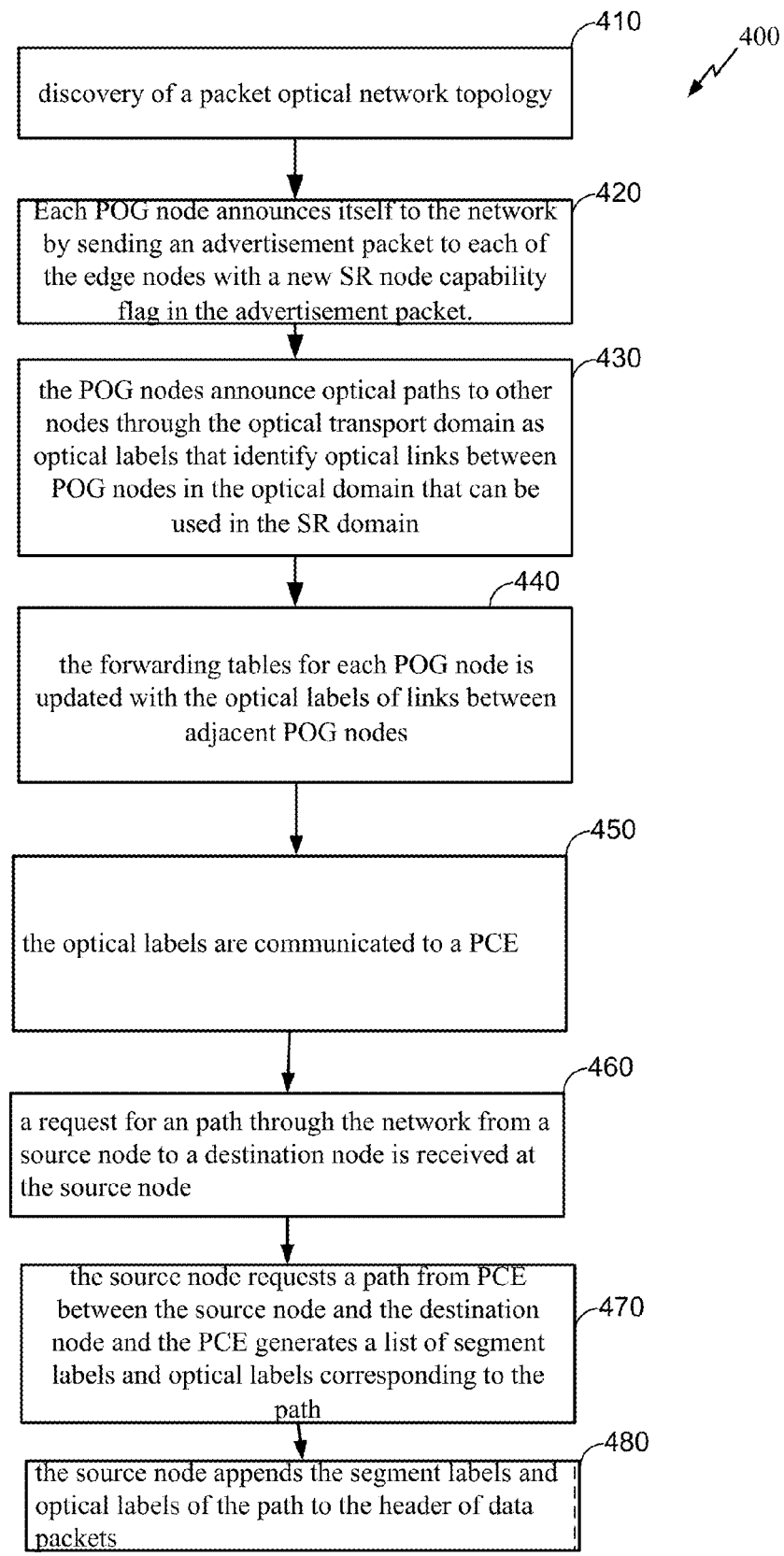
FIG. 4 illustrates an exemplary process for establishing a path through a packet optical network in accordance with some examples of the disclosure.

FIG. 4 illustrates an exemplary process for establishing a segment routed path through a packet optical network in accordance with some examples of the disclosure. As shown in FIG. 4, the process 400 begins in block 410 with the discovery of a packet optical network topology using well known conventional techniques, such as the IGP segment routing protocol (See Internet Engineering Task Force RFC7855) protocol. Block 410 enables each node in the network to identify itself and establish an identification and a conventional layer 2/layer 3 label for each node that is distributed to the nodes at the edge of the network and PCEs. In block 420, each POG node announces itself to the network by sending a conventional advertisement packet to each of the edge nodes with a new SR node capability flag in the advertisement packet. In block 430, the POG nodes announce optical paths to other nodes through the optical transport domain as segment labels that identify optical links between POG nodes in the optical domain (layer 1/layer 0) that can be used in the SR domain (packet domain, layer 3/layer 2). The segment labels are announced with an appropriate transit domain type, optical transport domain ID, and the label to be used to bind to the segment. In block 440, the forwarding tables for each POG node is updated with the segment labels of links between adjacent POG nodes (bind the segment corresponding to the segment label). The POG node is also responsible for programming its forwarding table to map every segment label entry into an appropriate forwarding action relevant in the optical domain, such as mapping it to a label-switched path. In block 450, the segment labels are communicated to a PCE (in a node or remote controller 10) using the well-known conventional extensions to Border Gateway protocol link state or PCE protocol link state. In block 460, a request for a path through the network from a source node to a destination node is received at the source node. In block 470, the source node requests a path from the PCE between the source node and the destination node and the PCE generates a list of segment labels and segment labels corresponding to the path. In block 480, the source node appends the segment labels and segment labels of the generated path to the header of data packets to be transmitted along the path to the destination node.

Figure 5A:
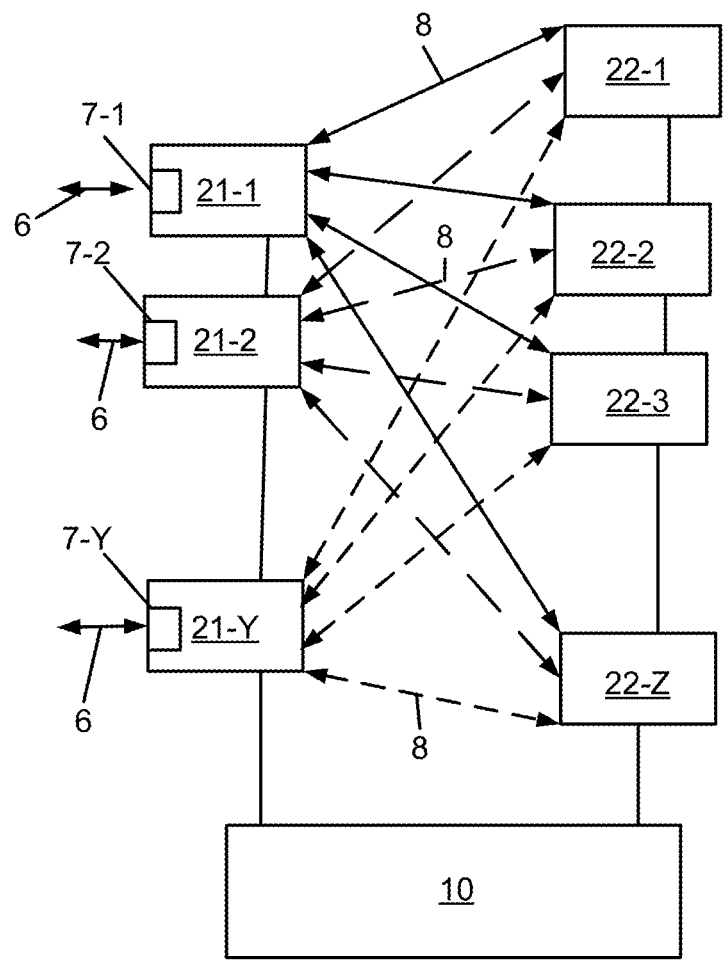
FIG. 5A illustrates an exemplary node of a network in accordance with some examples of the disclosure.

FIG. 5A is a diagram of exemplary components of node 12 (e.g. nodes 110-140). As shown in FIG. 5A, node 12 may include a controller 10 configurable to control the operation of the node 12 including connection admission (e.g. a software defined networking controller capable of connection admission control), line cards or modules 21-1, 21-2 to 21-Y (referred to collectively as "line modules 21," and individually as "line module 21") (where Y>=1) connected to switching planes 22-1, 22-2 to 22-Z (referred to collectively as "switching planes 22," and individually as "switching plane 22") (where Z>=1). Controller 10 may be an application, such as in a SDN, that manages flow control to enable intelligent networking. Controller 10 may be based on protocols, such as OpenFlow, that allow servers to tell switches (e.g. node 12) where to send packets (e.g. packet 417). The controller 10 may logically lie between network devices (e.g. node 12) at one end and applications at the other end. Controller 10 may be configured such that communications between applications and devices (e.g. node 12) have to go through the controller 10. The controller 10 may include a logic circuit 23 and a memory 24 configured to uses protocols such as OpenFlow to configure network devices and choose the optimal network path (e.g. first path 460 or second path 470) for application traffic. In effect, the controller 10 may be configured to serve as a sort of operating system for the network 16. By taking the control plane off the network hardware and running it as software instead, the controller 10 may facilitate automated network management and makes it easier to integrate and administer business applications. OpenFlow is a programmable network protocol designed to manage and direct traffic among routers and switches from various vendors. It separates the programming of routers and switches from underlying hardware. OpenFlow may consists of three parts: flow tables installed on switches (e.g. node 12), a controller 10 and a proprietary OpenFlow protocol for the controller 10 to talk securely with switches 12. Flow tables are set up on switches 12. Controller 10 talks to the switches 12 via the OpenFlow protocol and impose policies on flows. The controller 10 could set up paths through the network optimized for specific characteristics, such as speed, fewest number of hops or reduced latency.

While FIG. 5A shows a particular number and arrangement of components, node 12 may include additional, fewer, different, or differently arranged components than those illustrated in FIG. 5A. Also, it may be possible for one of the components of node 12 to perform a function that is described as being performed by another one of the components. Node 12 may configured as a TDM capable optical switch, a router, a reconfigurable optical add/drop multiplexer (ROADM) such as Infinera's commercially available DTN-X packet optical transport capable switch, Infinera's commercially available EMXP packet-optical transport switch, or similar device configurable to provide Carrier Ethernet services. Node 12 may also be referred to as a device, such as a first device, a second device etc. The line module 21 may be configured as a packet switching module, such as Infinera's PXM module, that supports switching of VLAN tagged packets into ODUFlex or ODU2e circuits. This allows the node 12 to dynamically switch IP/MPLS router traffic over an OTN network using the VLAN label ID to the destination device. This may enable packet switching functionality over an OTN network with maximum network efficiency and scalability by combining the benefits of device bypass with standardized ODU0 level multi-service grooming and switching.

Line module 21 may include hardware components such as one or more ports 7-1, 7-2 to 7-Y, or a combination of hardware and software components, that may provide network interface operations. Line module 21 may receive a multi-wavelength optical signal 6 and/or transmit a multi-wavelength optical signal 6 at the ports 7. A multi-wavelength optical signal 6 may include a number of optical signals of different optical wavelengths. In one implementation, line module 21 may perform retiming, reshaping, regeneration, time division multiplexing, and/or recoding services for each optical wavelength signal 6.

Switching plane 22 may include hardware components, or a combination of hardware and software components, that may provide switching functions to transfer data between line modules 21. In one implementation, switching plane 22 may provide fully non-blocking transfer of data. As to be explained below, switching plane 22 may be programmed to transfer data from a particular input port 6 to a particular output port 6.

As shown in FIG. 5A, each of line modules 21 may connect to each of switching planes 22 with a plurality of connections 8. The connections 8 between line modules 21 and switching planes 22 may be bidirectional. While a single connection 8 is shown between a particular line module 21 and a particular switching plane 22, the connection 8 may include a pair of unidirectional connections (i.e., one in each direction). A connection 8 from a line module 21 to a switching plane 22 will be referred to herein as an "ingress switch link," and a connection 8 from a switching plane 22 to a line module 21 will be referred to as an "egress switch link."

Figure 5B:
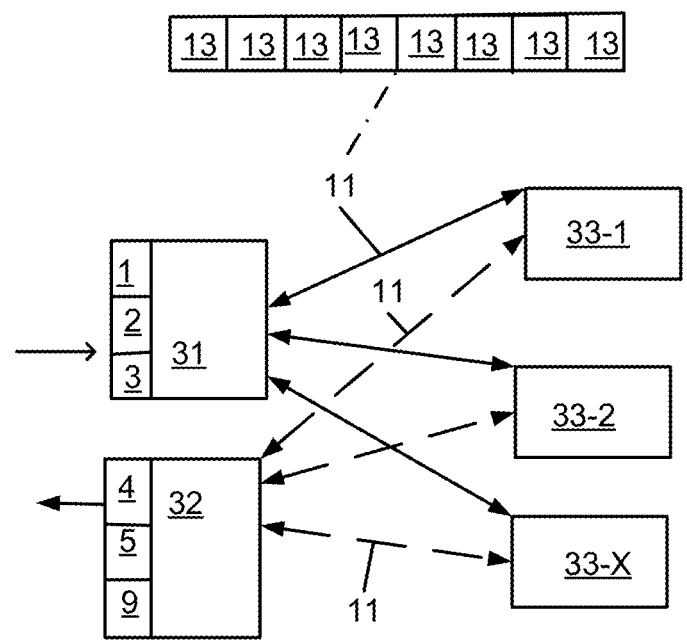
FIG. 5B illustrates an exemplary line module of the node in FIG. 5A in accordance with some examples of the disclosure.

FIG. 5B is a diagram of exemplary components of a line module 21. As shown in FIG. 5B, line module 21 may include a receiver (RX) photonic integrated circuit (PIC) 31, a transmitter (TX) PIC 32, and fabric managers (FMs) 33-1, 33-2 to 33-X (referred to collectively as "FMs 33," and individually as "FM 33") (where X>=1). While FIG. 5B shows a particular number and arrangement of components, line module 21 may include additional, fewer, different, or differently arranged components than those illustrated in FIG. 5B. Also, it may be possible for one of the components of line module 21 to perform a function that is described as being performed by another one of the components. It should be understood that the receiver 31 and transmitter 32 may include discrete components instead of PICs.

Receiver PIC 31 may include hardware, or a combination of hardware and software, that may receive a multi-wavelength optical signal 6, separate the multi-wavelength signal 6 into signals of individual wavelengths, and convert the signals 6 to electrical (i.e. digital or analog) signals 11. In one implementation, receiver PIC 31 may include components, such as a photodetector 1, a demultiplexer 2, and/or an optical-to-electrical converter 3. Transmitter PIC 32 may include hardware, or a combination of hardware and software, that may convert signals 11 from digital form into a multi-wavelength optical signal 6, and transmit the multi-wavelength signal 6. In one implementation, transmitter PIC 32 may include components, such as an electrical-to-optical converter 4, a multiplexer 5, and/or a laser 9. As shown in FIG. 5B, receiver PIC 31 and transmitter PIC 32 may connect to each of FMs 33. Receiver PIC 31 may transfer signals 11 to FMs 33. Transmitter PIC 32 may receive signals 11 from FMs 33.

FM 33 may include hardware, or a combination of hardware and software, that may process digital signals 11 for transmission to switching plane 22 or transmitter PIC 32. In one implementation, FM 33 may receive a stream of signals 11 from receiver PIC 31 and divide the stream into time slots 13. In one implementation, each time slot 13 may include the same quantity of bytes (e.g., each time slot 13 may contain an equal amount of bandwidth). In another implementation, each time slot 13 may not include the same quantity of bytes (e.g., at least one time slot may contain a different amount of bandwidth). The stream of signals 11 received by FM 33 may, in one implementation, already be segmented into time slots 13, for example when the multi-wavelength optical signal 6 is received already divided into time slots 13. In this situation, when dividing the signals 11 into time slots 13, FM 33 may identify the time slots 13 based on, for examples, identifiers in the signals 11.

In one implementation, the quantity of time slots 13 may equal the quantity of switches available in switching planes 22. Assume, for example, that there are sixteen switches available in switching planes 22. In this case, FM 33 may divide the signals 11 into sixteen equal time slots 13. FM 33 may send each of the time slots 13 to a different one of the switches. In one implementation, FM 33 may sequentially send each of the time slots 13 in a round robin fashion. In another implementation, FM 33 may send out each of the time slots 13 in another systematic fashion.

Figure 5C:
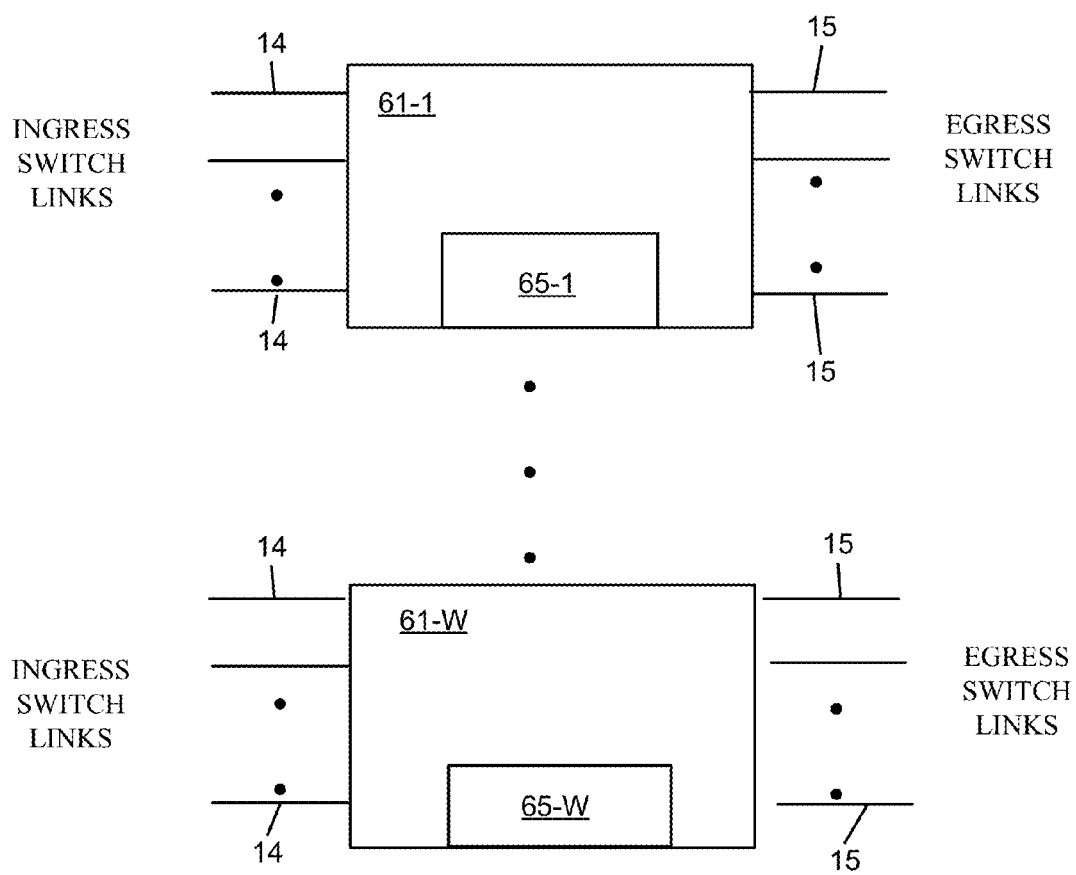
FIG. 5C illustrates an exemplary switch of the node in FIG. 5A in accordance with some examples of the disclosure.

FIG. 5C is a diagram of exemplary components of a switching plane 22. As shown in FIG. 5C, switching plane 22 may include switches 61-1 to 61-W (referred to collectively as "switches 61," and individually as "switch 61") (where W>=1). While FIG. 5C shows a particular number and arrangement of components, switching plane 22 may include additional, fewer, different, or differently arranged components than those illustrated in FIG. 5C. Also, it may be possible for one of the components of switching plane 22 to perform a function that is described as being performed by another one of the components.

Switch 61 may include hardware, or a combination of hardware and software, that may transfer a received time slot 13 on an ingress switch link 14 to a time slot 13 on an egress switch link 15, where the time slot 13 on the ingress switch link 14 may differ from the time slot 13 on the egress switch link 15. Switch 61 may include a set of ingress switch links 14 via which time slots 13 are received, and a set of egress switch links 15 via which time slots 13 are transmitted. Each ingress switch link 14 and egress switch link 15 may connect to a particular FM 33.

Switch 61 may include a configuration database 65. Configuration database 65 may store mapping information that instructs switch 61 on which egress switch link 15 and in what time slot 13 to send a block of data received within a particular time slot 13 on a particular ingress switch link 14 along with information on what port 7 to use. The mapping information may be programmed by an operator of node 12 on a per node 12 basis, and may remain fixed until changed by the operator. Alternatively, the mapping information may be programmed under the control of a network-level routing and signaling algorithm, and may remain fixed until changed by the algorithm. In one implementation, each of switches 61 may store identical mapping information. In other words, each of switches 61 may be programmed to map time slot A on its ingress switch link B to time slot C on its egress switch link D.

In one implementation, configuration database 65 may store the mapping information in the form of a table, such as provided below.

| Egress Switch Link 15 | Egress Time slot 13 | Ingress Switch Link 14 | Ingress Time slot 13 |
|---|---|---|---|
| #8 | #14 | #1 | #10 |

This information may identify an ingress switch link 14 and ingress time slot 13 (e.g., a time slot 13 on the ingress switch link 14) for each egress switch link 15 and egress time slot 13 (e.g., a time slot 13 on the egress switch link 15). As shown, for example, the mapping information may map time slot #10 on ingress switch link #1 to time slot #14 on egress switch link #8.

Figure 5D:
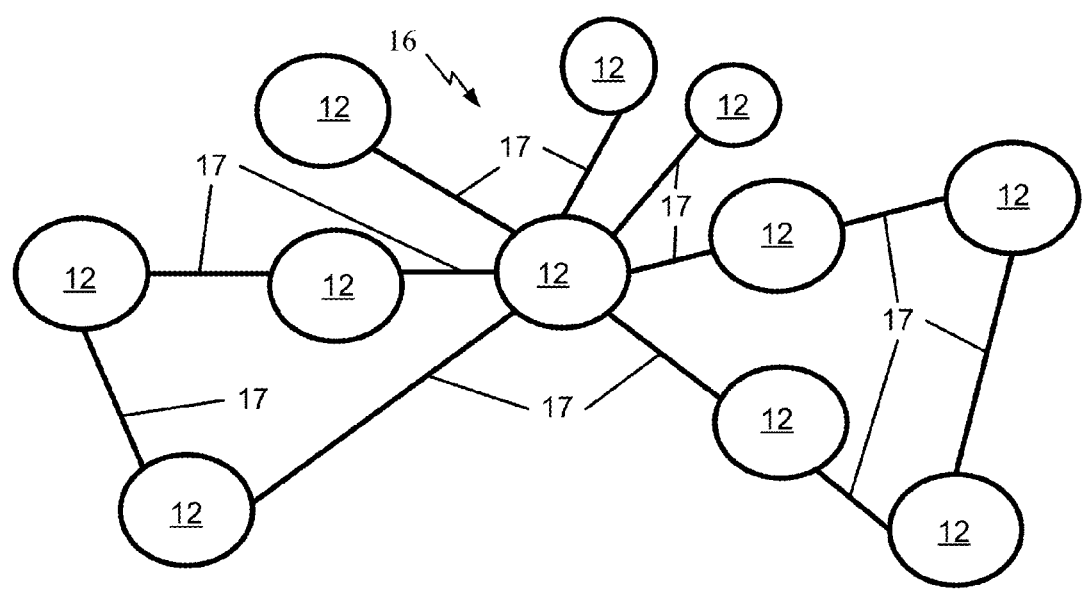
FIG. 5D illustrates an exemplary network configuration of the nodes in FIG. 5A in accordance with some examples of the disclosure.

FIG. 5D illustrates an exemplary network configuration of the nodes in FIG. 5A in accordance with some examples of the disclosure. As shown in FIG. 5D, an optical network 16 may include a plurality of nodes 12 interconnected by a plurality of connections 17. Each of the plurality of connections 17 may be configured to transport a plurality of multi-wavelength optical signals 6 having a plurality of time slots 13 or in another format. Each of the plurality of connections 17 may be, for example, a uni-directional or bi-direction medium such as an optical fiber capable of transporting an optical signal 6 or an electrical signal 11. The following examples describe apparatus and methods for use in conjunction with node 12. The example POGs described herein may be used as node 12 (including the controller 10) described in FIGS. 5A-5D.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures.

Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium (transient and non-transient) having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method comprising:
   a first gateway node announcing the first gateway node to a packet optical network;
   a second gateway node announcing the second gateway node to the packet optical network;
   the first gateway node transmitting a first segment label to a path computation engine, the first segment label configured to identify the second gateway node in an optical domain of the packet optical network;
   updating a forwarding table of the first gateway node with the first segment label;
   transmitting the first segment label to a first packet node; and
   appending, by the first packet node, the first segment label and a second segment label to a packet, the second segment label configured to identify the first gateway node in a packet domain of the packet optical network,
   wherein the first gateway node announces the first gateway node to the packet optical network using an announcement packet that includes a packet optical gateway flag,
   wherein the announcement packet includes a transport domain type of the first gateway node and an optical domain identification of the first gateway node,
   wherein the Border Gateway protocol link state extension or the PCE protocol link state extension includes information about an OTN mapping of a first optical link between the first gateway node and the second gateway node, a timeslot for the first optical link, and an optical protection scheme for the first optical link.

2. The method of claim 1, wherein the first gateway node announces the first gateway node to the packet optical network using an announcement packet that includes a packet optical gateway flag.

3. The method of claim 1, wherein the first segment label is transmitted to the path computation engine using a Border Gateway protocol link state extension or PCE protocol link state extension.

4. The method of claim 1, further comprising the first packet node requesting the first segment label from the path computation engine before the transmitting the first segment label to the first packet node.

5. The method of claim 1, wherein the path computation engine is located in a remote server.

6. The method of claim 1, wherein the updating the forwarding table of the first gateway node with the first segment label includes mapping the first segment label to a label switched path between the first gateway node and the second gateway node.

7. A non-transitory computer-readable medium comprising instructions that, when executed by a processor, cause the processor to:
   announce a first gateway node to a packet optical network;
   announce a second gateway node to the packet optical network;
   transmit a first segment label to a path computation engine, the first segment label configured to identify the second gateway node in an optical domain of the packet optical network;
   update a forwarding table of the first gateway node with the first segment label;
   transmit the first segment label to a first packet node; and
   append the first segment label and a second segment label to a packet, the second segment label configured to identify the first gateway node in a packet domain of the packet optical network,
   wherein the first segment label is transmitted to the path computation engine using a Border Gateway protocol link state extension or PCE protocol link state extension,
   wherein the Border Gateway protocol link state extension or the PCE protocol link state extension includes information about an OTN mapping of a first optical link between the first gateway node and the second gateway node, a timeslot for the first optical link, and an optical protection scheme for the first optical link.

8. The non-transitory computer-readable medium of claim 7, wherein the first gateway node announces the first gateway node to the packet optical network using an announcement packet that includes a packet optical gateway flag.

9. The non-transitory computer-readable medium of claim 7, wherein the announcement packet includes a transport domain type of the first gateway node and an optical domain identification of the first gateway node.

* * * * *